J. STEVENS.
Steam Plow.
No. 21,803.
Patented Oct. 12, 1858.
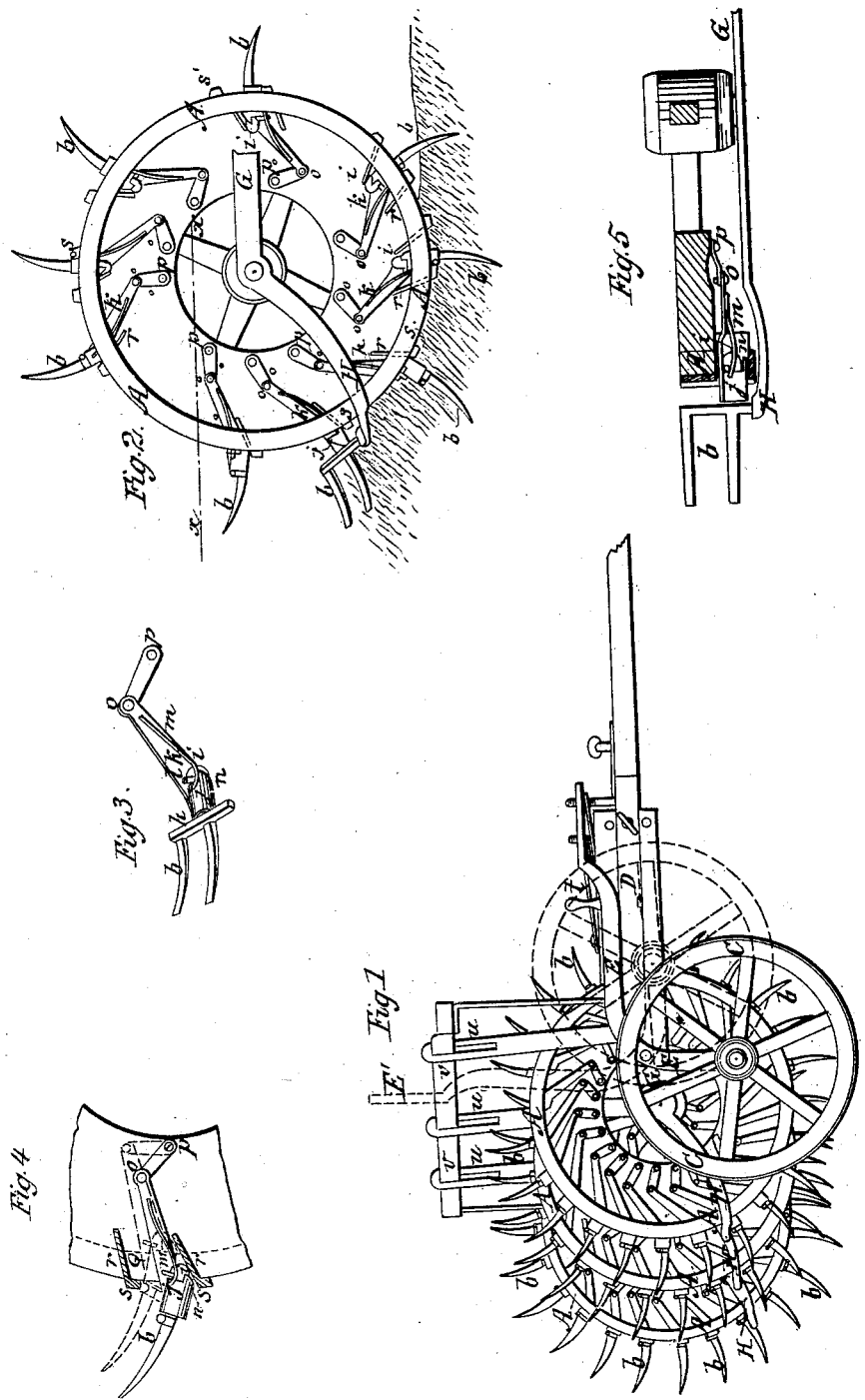

UNITED STATES PATENT OFFICE.

JUDD STEVENS, OF MARENGO, NEW YORK, ASSIGNOR TO HIMSELF AND JOHN L. BEADLE, OF SAME PLACE.

IMPROVEMENT IN SPADING-MACHINES.

Specification forming part of Letters Patent No. 21,803, dated October 12, 1858.

*To all whom it may concern:*

Be it known that I, JUDD STEVENS, of Marengo, in the county of Wayne and State of New York, have invented a new and Improved Machine for Digging, Spading, and Ditching; and I do hereby declare that the following is a full, clear, and exact description of the construction and operation of the same, reference being had to the accompanying drawings, making part of this specification, and to the letters of reference marked thereon.

Figure 1 is a side elevation of my machine. Fig. 2 is a detached view of one of the rotating spade-carriers. Fig. 3 is a view of one of the spades or forks detached. Fig. 4 represents a portion of the wheel with the rim in section, showing the operation of the fork. Fig. 5 is a horizontal section of the spade-wheel on the line $x\ x$, Fig. 2.

The nature of my invention consists in the employment of mechanism whereby I give the spade a sliding and turning motion for raising and discharging the earth similar to the manipulation of that implement by the human hands, whereby its operation is rendered more effective and thorough.

To enable others to make and use my invention, I will proceed to describe it.

I employ a gang or series of wheels, A A, Fig. 1, placed side by side, one slightly in advance of the other and rotating independent of each other. The rim or periphery of each is provided with a number of slots or openings oblique to its radius, in which are arranged the forks $b$, the construction and operation of which will be hereinafter described.

A pair of truck-wheels, C, attached to each side of the frame D by the bent lever E, serve to sustain the weight of the machine and to elevate the spade-wheels A above the ground when not in operation, enabling it to be readily moved from place to place. When prepared for operation the levers E are raised to a vertical position, as shown in dotted lines at E', by which the truck-wheels are raised, and the weight of the machine rests on the spade-wheels alone.

Each of the wheels A has an independent bearing or journal in the bar G, an extended portion of which, H, forms a tripping-lever for turning the forks in their operation upon the soil. The forks or spades are arranged at short distances around the periphery of the wheel. Each one consists of a cross-head, $h$, and two or more tines, as may be preferred, all of which, or the greater part, are disposed on one side of the center. A short stock or shank, $i$, passes through the ferrule $j$ of the stirrup-handle $k$, in which it is loosely held by the pin $l$, which allows it to turn a quarter of a revolution, or thereabout, when it is stopped by the projecting part of the ferrule $n$. A light spring, $m$, attached to $k$, by pressure against the pin keeps the spade in a horizontal position except when it passes the tripping-lever H, when the projecting end of the head $h$ strikes it, turning it to a vertical position edgewise.

The stirrup-lever $k$ is jointed at $o$ and bolted to the wheel, or an interior rim thereof, about equidistant from the axis to the periphery, as indicated by $p$. The stirrup-lever is attached at such a point that when the fork is horizontal it is elevated in about the position of the handle of a fork or spade for hand use. The socket portion $j$ lies in the opening in the rim Q, Fig. 4, and the partitions $r$ between the openings are oblique to the periphery, so as to form inclined planes on which this socket rests. A strong cross-bar, $s$, covers each of these partitions, projects from the rim, and forms a bearing or fulcrum for the spade when lifting the earth, and by receiving the head of the same prevents its turning as it enters the ground.

The joint $o$ of the stirrup-handles allows the fork to slide in the opening Q, so as to vary its projection from the rim of the wheel from four to six inches, and as the wheel revolves those upon the upper side slide down the inclines $r$ by their own gravity and enter the ground with the head $h$ firmly braced against the projection $s$, and the end of the stock $i$ bearing against the next partition, as seen in Fig. 2. Each is thus firmly held while it is forced into the ground, and as the wheel rotates and it begins to lift the soil it slides on its bearings as far as the extension of the jointed stirrup-lever will permit, thus gradually raising and spreading the earth with a movement analogous to the motion of a spade when operated by hand. After raising the earth a little above the surface of the ground the head $h$ strikes lever H, which turns it suddenly and discharges its burden, thoroughly pulverizing and scattering it. Each fork in succession enters the earth and in the same manner gradually lifts the ground, and is in turn tripped and discharged as it passes H. When released from the trip-lever the action of the spring $m$ restores it to its former position. The jointed stirrup-lever operates with a pliability and ease that, while it does efficient execution on the soil, does not jar or strain the machine, and particularly adapts it to passing stones and uneven portions of the ground. Each spade-wheel has its bearing in a separate bar, G, which is hung on a center which allows it to yield if the spades come in contact with any heavy stone or other formidable resistance. These bars are in fact levers, and are held to their position by a spring, $t$, on their short arms, and are also suspended by the straps $u$ through slots in which the bearing-frame $v$ passes. These slots are of sufficient length to admit of the necessary play of the levers. The fulcrum of the spades when acting on the ground is at or about the periphery of the wheel A, the diameter of which is some four feet, or thereabout, which, with the stirrup or elbow levers $k$, gives a powerful system of compound leverage, producing easy draft with efficient action.

The spade-wheels may each be formed to work a furrow of from eight to twelve inches, and the number of wheels may be increased in a single machine as far as is consistent with the power employed to draw it. It may be used very successfully for ditching, using one or two wheels, according to the width required, and placing an inclined board or apron under the trip-lever to carry the dirt to one side as it is discharged.

Instead of bolting the stirrup-lever at P its fastening may be made to work in a slot in the wheel and give the requisite motion to the spade; but I prefer the previously-described method.

What I claim as my invention, and desire to secure by Letters Patent, is—

1. Jointing or hanging the spade $k$ to the wheel A in such a manner that in the forward motion of the machine it will remain in proximity with the periphery of the wheel until the lifting of the earth commences, when it shall pass outward or slide upon its bearing, thereby acting more efficiently to raise and disintegrate the soil, substantially in the manner and for the purpose set forth.

2. The combination and arrangement of the tripping-lever H with the spade $b$, substantially as and for the purpose herein described.

JUDD STEVENS.

Witnesses:
 JOHN L. BEADLE,
 I. FRASER.